United States Patent [19]

Sugiura et al.

[11] Patent Number: 5,631,488

[45] Date of Patent: May 20, 1997

[54] SEMICONDUCTOR INTEGRATED CIRCUIT DEVICE

[75] Inventors: Satoshi Sugiura; Jun Suzuki, both of Tokorozawa, Japan

[73] Assignee: Pioneer Electronic Corporation, Tokyo, Japan

[21] Appl. No.: 855,496

[22] Filed: Mar. 23, 1992

Related U.S. Application Data

[63] Continuation of Ser. No. 569,033, Aug. 17, 1990.

[30] Foreign Application Priority Data

Mar. 16, 1990 [JP] Japan ................................ 2-67885

[51] Int. Cl.⁶ .......................... H01L 29/82; H01L 43/00; H01L 27/14; H01L 31/0232
[52] U.S. Cl. ........................ 257/421; 257/424; 257/431; 257/432
[58] Field of Search .................... 257/731, 81, 80, 257/99, 421, 422, 423, 431, 432, 433

[56] References Cited

U.S. PATENT DOCUMENTS

| | | | |
|---|---|---|---|
| 3,258,723 | 6/1966 | Osafune et al. | 357/27 |
| 3,533,022 | 10/1970 | Engeler et al. | 357/27 |
| 3,671,793 | 6/1972 | Scarlett | 357/27 |
| 4,935,793 | 6/1990 | Boutigny | 357/27 |

Primary Examiner—Mahshid D. Saadat
Assistant Examiner—Jhihan B. Clark
Attorney, Agent, or Firm—Sughrue, Mion, Zinn, Macpeak & Seas

[57] ABSTRACT

There is disclosed a semiconductor integrated circuit device in which a semiconductor integrated circuit substrate provided with an electromagnetic coil from which lead wires are drawn out is movably arranged within a magnetic field. When a current is caused to flow in the magnetic coil through the conductors, a force in the direction of a magnetic field is exerted on the electromagnetic coil. Thus, this semiconductor integrated circuit device can operate as an actuator allowing the entirety of the substrate to be movable in either a positive or a negative direction the magnetic field. When the substrate is moved interlocking with a measurement object, an induced current flows in the electromagnetic coil. Accordingly, by measuring this current, it is possible to operate this device as a sensor capable of measuring changes in the physical quantity, etc. of the measurement object.

14 Claims, 8 Drawing Sheets

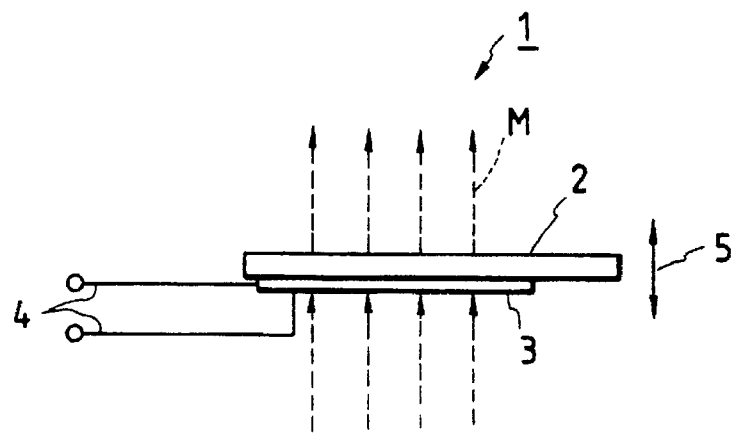
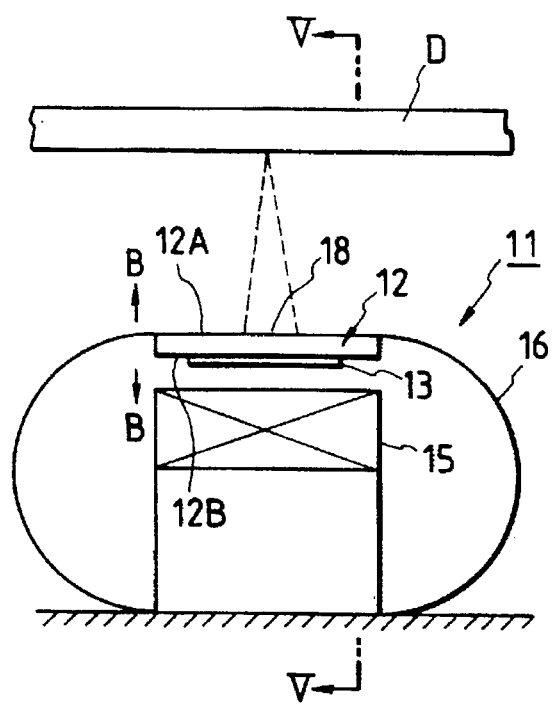 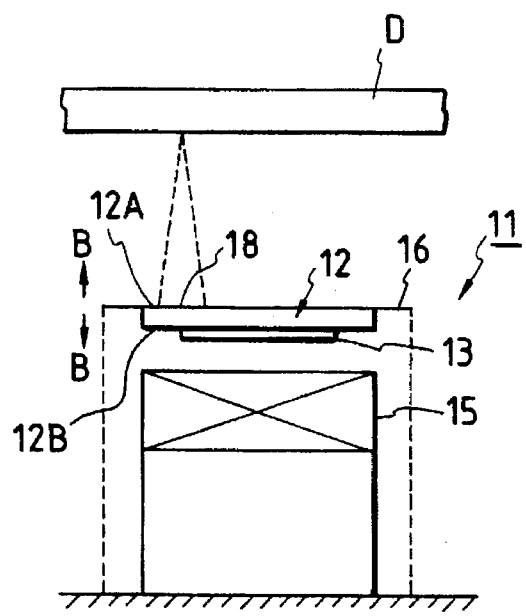

SEMICONDUCTOR INTEGRATED CIRCUIT DEVICE

This is a continuation of application Ser. No. 07/569,033 filed Aug. 17, 1990.

BACKGROUND OF THE INVENTION

This invention relates to a semiconductor integrated circuit device, and more particularly to a semiconductor actuator utilizing an electromagnetic force, or a semiconductor sensor utilizing an electromagnetic induction.

Recently, with development of Compact Disks (CDs) of digital audio disks, Laservision Disks (LVDs) of video and acoustic information media, write once Read Many-type optical disks, and rewritable photomagnetic disks, etc., it has been required for an optical pickup to be small-sized and lighten weight. To neet such a requirement, in place of an optical pickup of a structure such that optical parts such as lens or mirror, etc. are combined with each other, an optical integrated circuit type pickup to which the integrated circuit technology established in the manufacturing field of LSI is applied has been proposed. For example, see Toshiaki Suhara, Shogo Ura, and Hiroshi Nishihara (Department of Electronics, Osaka University), 'Optical Integrated Disk Pickup Head', "Optronics" monthly published, No. 2, pp. 149–154 (1989), or the publication of the Japanese Patent Laid Open Publication No. 296540/86.

However, in case that the above-mentioned optical integrated type pickup is used in an actual playback equipment such as a CD player or an LVD player, etc., it is required to affix or mount an actuator for control. In this case, following the conventional form, an optical head of a structure which will be described below will be provided. This optical head is composed of, e.g., a cylindrical magnet, a cylindrical bobbin, and a semiconductor chip on which an optical integrated circuit-type pickup is formed. The cylindrical bobbin is of a hollow structure in which the diameter of the hollow portion is larger than that of the cylindrical magnet. This cylindrical magnet is mounted on the cylindrical bobbin so that it is seated thereon. One end surface of the cylindrical bobbin is closed and the semiconductor chip is affixed on that end surface. Further, an electromagnetic coil is provided on the cylindrical side surface of the cylindrical bobbin so as to surround it. In this case, a magnetic field is formed by magnetic lines of force directed from one end surface of the cylindrical magnet toward the other end surface thereof. These magnetic lines of force penetrate through the end surface of the bobbin and the semiconductor chip surface. When a current is caused to flow in the electromagnetic coil on the side surface of the bobbin, an electromagnetic force attempting to move the electromagnetic coil, i.e., the bobbin toward either a positive or a negative direction of the longitudinal axis of the cylindrical magnet is produced by "Fleming's left-hand rule". Accordingly, since the amount of movement of the semiconductor chip in the axial direction of the magnet can be adjusted by changing the direction of current flowing and the intensity of that current, this mechanism will form a focusing actuator.

However, since the sizes of these electromagnetic coil and magnet are considerably larger than that of the semiconductor chip, there was a problem in that the relatively small size of semiconductor chip was not taken advantage of. In addition, because of the large number of parts, there was room for improvement from the viewpoint of assembly and cost.

An object of this invention is to provide a semiconductor integrated circuit device which can be utilized as a small-sized and lightweight actuator or a small-sized sensor.

SUMMARY OF THE INVENTION

To solve the above-mentioned problems, in accordance with this invention, an electromagnetic coil is provided on a semiconductor integrated circuit substrate. A pair of conductors are drawn out from the magnetic coil. Further, the semiconductor integrated circuit substrate is movably arranged within a magnetic field.

In accordance with a preferred embodiment of this invention, when a current is caused to flow in the magnetic coil through the conductors, a right-handed magnetic field is produced toward the direction in which the current flows in accordance with "Ampere's right-handed screw rule". In this case, since the magnetic lines of force penetrate through the electromagnetic coil, an attractive force or a repulsive force in a direction of the magnetic lines of force is exerted on the electromagnetic coil. As a result, the semiconductor integrated circuit substrate also moves in the positive or negative direction of the magnetic lines of force in the direction of the magnetic field. This permits the semiconductor integrated circuit device to operate as a subminiature actuator. Accordingly, since it is possible to move a semiconductor intergrated circuit substrate having a predetermined function and to carry out a positioning control thereof, such a semiconductor integrated circuit device can be applied to various uses. As a preferred example, an optical head for recording/playback of an optical disk, which is smaller and lighter than the conventional optical head, can be advantageously provided.

Further, in the above-mentioned semiconductor integrated circuit device, when an arrangement is employed such that a semiconductor integrated circuit substrate can interlock with an object to be measured to move the semiconductor integrated circuit substrate, an induced electromotive force to prevent changes in magnetic flux penetrating through the electromagnetic coil is produced in the electromagnetic coil in accordance with Lenz's law. As a result, an induced current flows. By taking out this induced current through the conductors to measure it by a galvanometer, it is possible to know a quantity in changes of the measurement object. This permits the semiconductor integrated circuit device to operate as a subminiature sensor. Accordingly, in the case of moving this semiconductor integrated circuit substrate within a magnetic field, or changing that magnetic field, by measuring an induced current produced in the coil, such a device can be advantageously used as a semiconductor integrated circuit device having a subminiature sensor function for measuring changes in a physical quantity such as displacement, pressure, magnetism, or the like.

BRIEF DESCRIPTION OF THE DRAWINGS

FIG. 3 is a conceptual view for explaining an embodiment of a semiconductor integrated circuit device according to this invention;

FIG. 4 is a view showing the structure of an optical head which is a first embodiment according to this invention;

FIG. 5 is a cross sectional view of the optical head, taken along the line V—V in FIG. 4;

DESCRIPTION OF THE PREFERRED EMBODIMENTS

General Description of the Optical Head

Prior to describing the various embodiments of this invention, a conventional optical head will be described to assist in the understanding of this invention.

Figure 1:
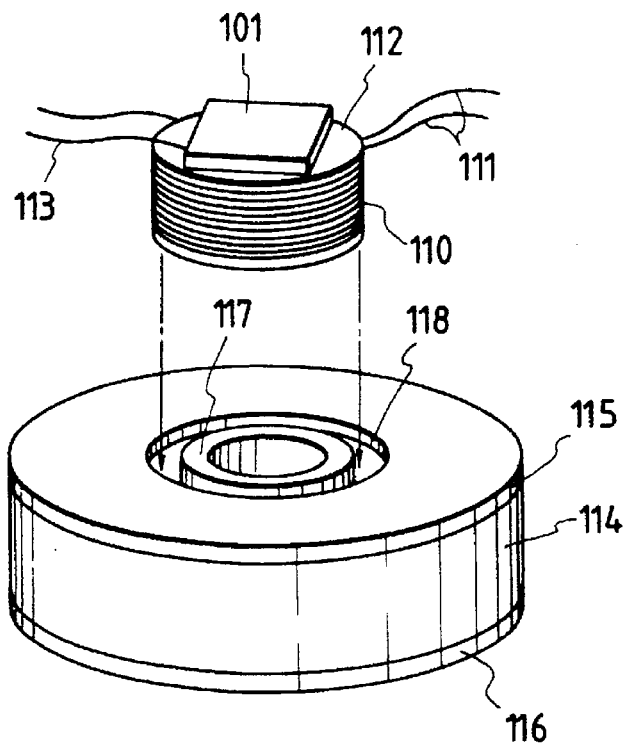
FIG. 1 is a perspective view showing an example of a conventional optical head.
Figure 2:
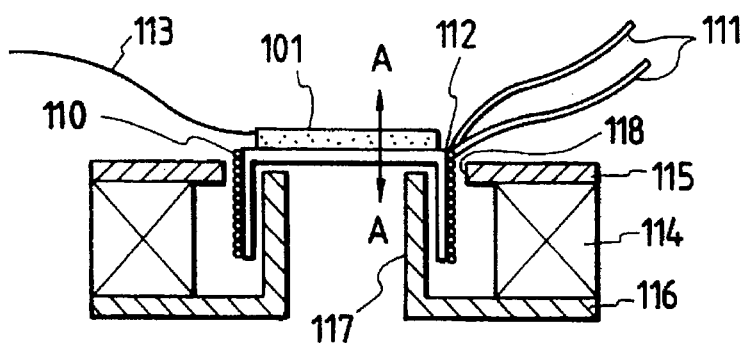
FIG. 2 is a cross sectional view of the optical head shown in FIG. 1.

The conventional optical head is constituted as shown in FIGS. 1 and 2.

In FIGS. 1 and 2, a semiconductor chip 101 on which an optical integrated circuit type pickup is formed is mounted or affixed on a cylindrical bobbin 112. An electromagnetic coil 110 is provided on the cylindrical surface of the bobbin 112. The bobbin 112 is mounted, in an insertion hole 118, on a cylindrical portion 117 of a lower yoke 116 of a magnet 114 so that it is seated thereon, and is movable in the axial direction of the cylindrical portion 117 (A—A direction).

In this case, a magnetic field is created by the magnet 114. When a current is caused to flow in the electromagnetic coil 110 through lead wires 111, an electromagnetic force is exerted on the electromagnetic coil 110, so it moves in the A—A direction. By this operation, it is possible to carry out, e.g., a focusing servo of the semiconductor chip 101. In this example, the electromagnetic coil 110 and the magnet 114 form a focusing actuator.

Conceptual Explanation of the Embodiment of this Invention

The concept of the structure and the operation of this invention will now be described.

The basic embodiment of this invention is constituted as shown in FIG. 3.

In FIG. 3, this semiconductor integrated circuit device 1 is such that an electromagnetic coil 3 is provided on a semiconductor integrated circuit substrate 2. A pair of conductors 4 are drawn out from the electromagnetic coil 3. Further, the semiconductor integrated circuit substrate 2 is movably disposed within a magnetic field M.

In FIG. 3, when a current is caused to flow in the electromagnetic coil 3 through the conductors 4, a right-handed magnetic field is produced toward the direction in which that current flows in accordance with "Ampere's right-handed screw rule". In this case, since lines of magnetic force based on the magnetic field M are penetrated through the electromagnetic coil 3, an attractive force or a repulsive force in the direction 5 of the magnetic field M is exerted on the electromagnetic coil 3. As a result, the semiconductor integrated circuit substrate 2 also moves in the positive or negative direction 5 of the magnetic field M. This permits the semiconductor integrated circuit device 1 to operate as an actuator.

In the above-mentioned semiconductor integrated circuit device 1, when an arrangement is employed such that the semiconductor integrated circuit substrate 2 is interlocked with a measurement object to be moved therewith, an induced electromotive force to prevent changes in the magnetic flux penetrating through the electromagnetic coil is produced in accordance with "Lenz's law". As a result, an induced current flows. By taking out this induced current through conductors 4 to measure it using galvanometer (not shown), it is possible to determine a quantity of changes of the measurement object by an inverse operation. This permits the semiconductor integrated circuit device 1 to operate as a sensor.

Preferred embodiments of this invention will now be described with reference to the attached drawings.

First Embodiment

An optical head which is a first embodiment of a semiconductor integrated circuit device according to this invention is shown in FIGS. 4 and 5.

This optical head 11 comprises a semiconductor integrated circuit substrate 12, a magnet 15 for producing a magnetic filed, and a flexible printed wiring board 16 as support means serving as conductors.

Figure 6:
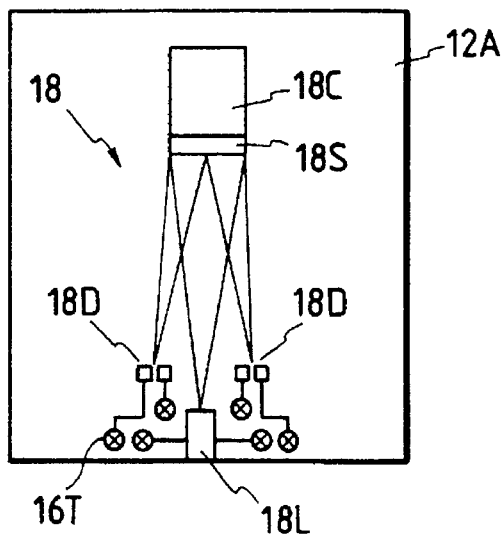
FIG. 6 is a view showing the front side of a semiconductor integrated circuit substrate in the optical head shown in FIG. 4.
Figure 7:
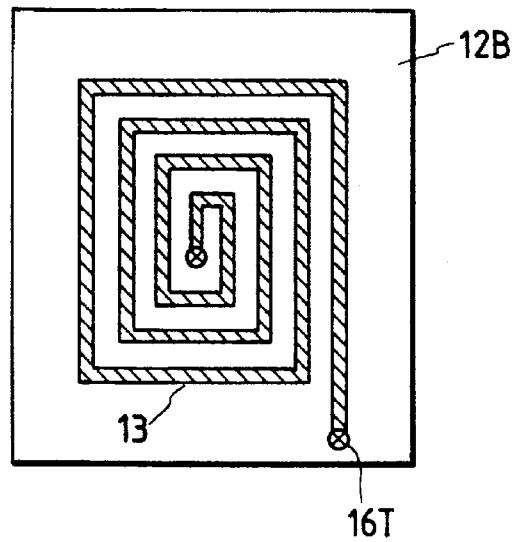
FIG. 7 is a view showing the back side of the semiconductor integrated circuit substrate shown in FIG. 6.

An optical integrated circuit type pickup 18 is formed on the front side 12A of the semiconductor integrated circuit substrate 12, and an electromagnetic coil 13 is formed on the back side 12B thereof. The front side 12A opposite to the optical disk D of the semiconductor integrated circuit substrate 12 and the side 12B corresponding to the back side thereof and opposite to the magnet 15 are shown in FIGS. 6 and 7, respectively.

The optical integrated circuit type pickup 18 comprises a laser diode 18L, a focusing grating coupler 18C, a grating beam splitter 18S, and photo detectors 18D.

The laser diode 18L generates a laser beam. This laser beam is conducted to the focusing grating coupler 18c through an optical waveguide layer (not shown) of the semiconductor integrated circuit substrate 12. The focusing grating coupler 18C changes the laser beam so as to take a form of spots by the object lens action to focus it onto information pits on the recording surface of the optical disk D. The laser beam is reflected on the surface of the information pits. The reflected light is incident back to the focusing grating coupler 18C for a second time, and is then conducted to the grating beam splitter 18S. The grating beam splitter 18S splits the reflected light into those in two light paths. These two split light rays are incident to four photo detectors 18D. These photo detectors 18D output electric signals corresponding to a quantity of incident light rays. From these electric signals, information signals and signals for servo control control are provided.

Further, the electromagnetic coil 13 is provided on the side 12B. Lines of magnetic force based on a magnetic field produced by the magnet 15 penetrate through the electromagnetic coil 13 on the semiconductor integrated circuit substrate 12.

Figure 8:
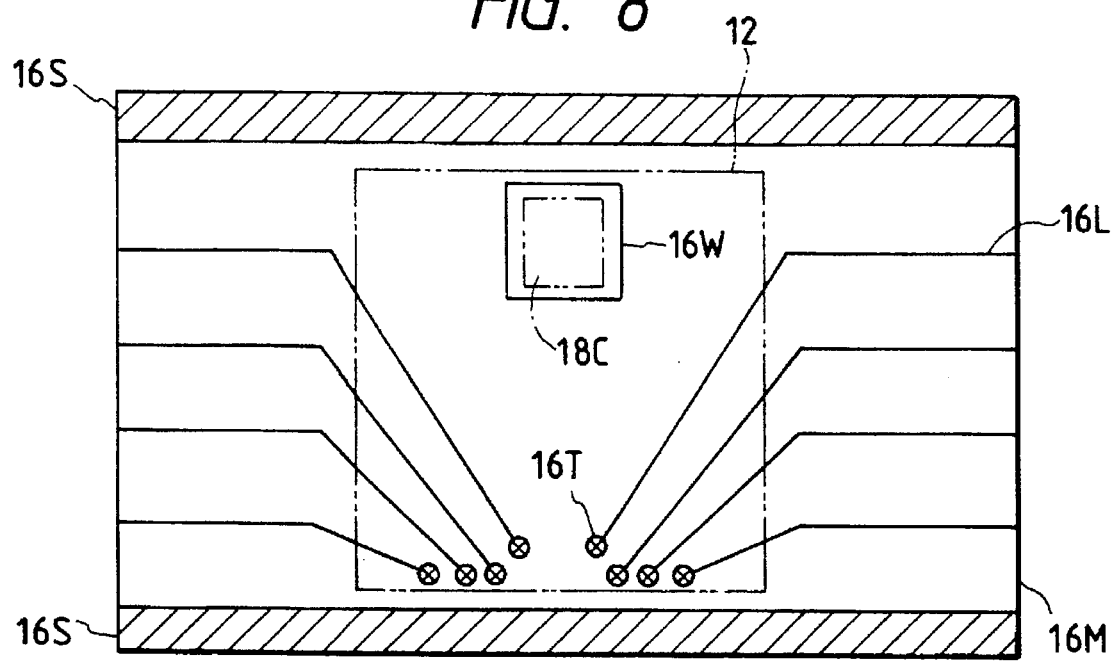
FIG. 8 is a view showing a flexible printed wiring board in the optical head shown in FIG. 4.

The flexible printed wiring board 16 is constituted, as shown in FIG. 8, by assembling an elastic member 16S like a metal film for rendering suitable rigidity and elasticity and lead wires 16L of conductors for wiring into a film like matrix 16M having elastic and insulating properties like a plastic material.

The electrical connection between the lead wires 16L and the optical integrated circuit type pickup 18 or the electromagnetic coil 13 is carried out through land terminals 16T.

This flexible printed wiring board 16 is constituted, as shown in FIGS. 4 and 5, by bending the both end portions of a belt-shaped flexible printed wiring board to cover the surface of the magnet 15 in a manner to take a form of cylinder or leaf spring. Further, the semiconductor integrated circuit substrate 12 is mounted or affixed on the surface of this flexible printed wiring board 16 just above the magnet 15. Accordingly, the semiconductor integrated circuit substrate 12 is resiliently supported by the flexible printed wiring plate 16. Thus, this substrate can move in the direction of the optical disk D (B—B direction). In this case, the portion of the flexible printed wiring board 16 immediately above the focusing grating coupler 18C of the optical integrated circuit type pickup 18 is cut out in the form of a window as indicated by reference symbol 16W of FIG. 8. Thus, an arrangement such that irradiation of a laser beam is not prevented is provided.

The operation of the optical head 11 will now be described.

When a control current is caused to flow in the electromagnetic coil 13 through the lead wires 16L by a power supply (not shown), a new right-handed magnetic field with respect to the control current direction is produced in the electromagnetic coil 13. Accordingly, an electromagnetic force in the B—B direction is exerted on the electromagnetic coil 13. As a result, since the force in the B—B direction is also exerted on the semiconductor integrated circuit substrate 12, it is possible to move the optical head 11 in the positive or negative direction of the optical disk D. Thus, focusing servo of the optical head 11 can be carried out.

The method of forming the electromagnetic coil provided on the semiconductor integrated circuit substrate and the configuration of the electromagnetic coil will now be described. The electromagnetic coil 13 is formed by using the multilayer interconnection formation technology which is one of integrated circuit technologies to etch a spiral coil pattern on the surface of a silicon substrate to vacuum-deposit aluminum, etc. thereon.

Figure 9:
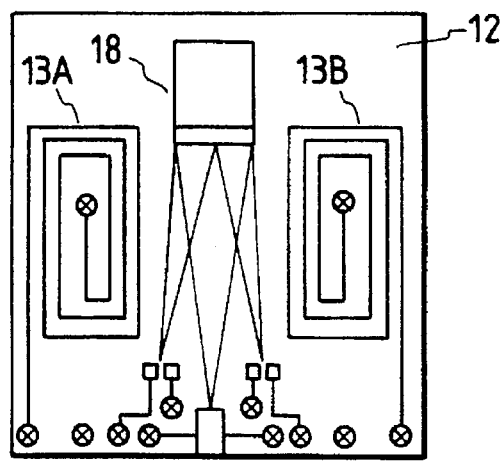
FIG. 9 is a top view showing a modified example of the front side of the semiconductor integrated circuit substrate in the optical head shown in FIG. 4.

The pattern of the electromagnetic coil is not limited to a square spiral shown in FIG. 7. Further, patterns of circle, ellipse, or other curves may be used. This coil pattern may be constructed not only in a planar spiral form but also in a three-dimensional spiral or helical form in layer direction in the same manner as in an ordinary electromagnetic coil by the application of the multilayer interconnection technology. In addition, the number of coil patterns on a single semiconductor integrated circuit substrate is not limited to one as in the pattern shown in FIG. 7. Two coil patterns or more may be adopted. For example, as shown in FIG. 9, there may be employed an arrangement to provide two electromagnetic coils 13A and 13B so that the optical integrated circuit type pickup 18 is disposed therebetween. In this case, by adjusting control currents caused to flow in individual electromagnetic coils, it is possible to alter the directional angle of a laser beam with respect to the optical disk D. By making use of this, tracking servo of the optical head can be also carried out. In addition, the electromagnetic coil may be provided on either side of the semiconductor integrated circuit substrate 12.

Second Embodiment

Figure 10:
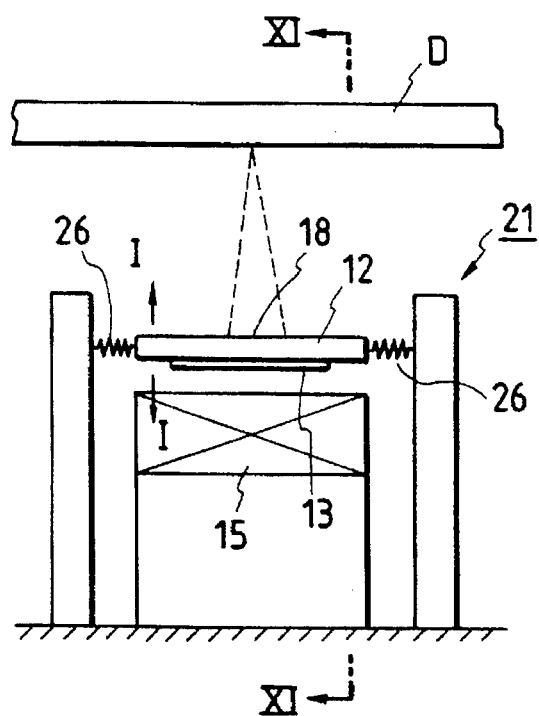
FIG. 10 is a view showing the structure of an optical head which is a second embodiment of this invention.
Figure 11:
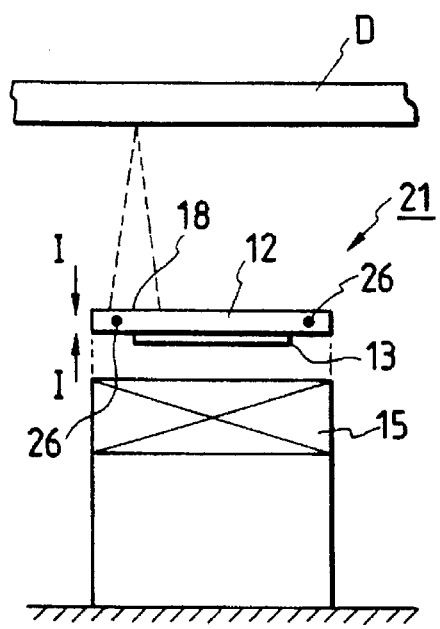
FIG. 11 is a cross sectional view of the optical head, taken along the line XI—XI in FIG. 10.

An optical head which is a second embodiment of a semiconductor integrated circuit device according to this invention is shown in FIGS. 10 and 11.

This optical head 21 differs from the optical head 11 in the first embodiment in that four elastic supporters 26 are affixed on the semiconductor integrated circuit substrate 12 as support means in place of the flexible printed wiring board 16 of the optical head 11 in the first embodiment shown in FIGS. 4 to 9. These supporters 26 may be not only in the form of coil, rod and plate, etc., but also in other forms. In addition, the number of supporters is not limited to four as in the embodiment.

Also in the second embodiment, by causing a control current to flow in the electromagnetic coil 13 through conductors (not shown) by a power supply (not shown), it is possible to carry out focusing servo. Further, in the same manner as in the modified embodiment shown in FIG. 9, an arrangement may be employed to provide two electromagnetic coils to carry out tracking servo. In addition, similarly to the first embodiment, there is not limitation also in connection with the number of coil patterns, etc.

In the above-mentioned first and second embodiments, the electromagnetic coil is provided on the semiconductor integrated circuit substrate provided with the optical integrated circuit type pickup, thus to allow the semiconductor integrated circuit device to have a function as the optical head. However, this invention is not limited to the optical integrated circuit type pickup, but can be utilized as a semiconductor integrated circuit device where another integrated circuit is mounted on a semiconductor integrated circuit substrate and the semiconductor integrated circuit substrate itself can be moved.

Alternatively, the device of this invention may be used as a miniaturized actuator including no integrated circuit and directed to only drive.

Third Embodiment

Figure 12:
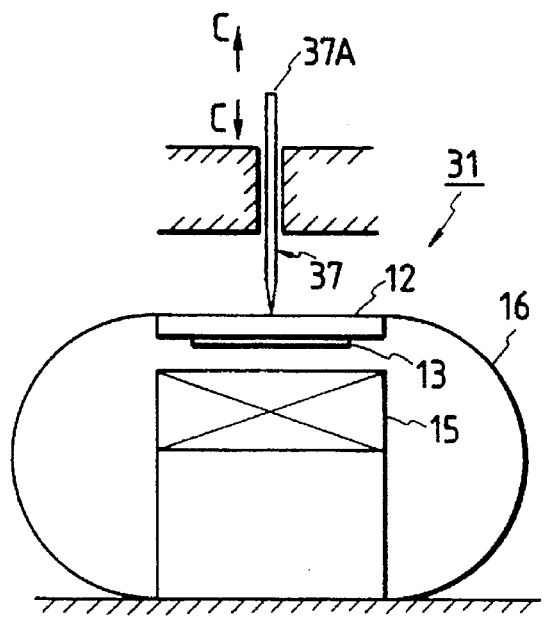
FIG. 12 is a view showing the structure of a displacement sensor which is a third embodiment of this invention.

A displacement sensor which is a third embodiment of a semiconductor integrated circuit device according to this invention is shown in FIG. 12.

This displacement sensor 31 is constituted of a structure such that the optical integrated circuit type pickup is removed from the optical head 11 of the first embodiment shown in FIGS. 4 to 9, and that a rod 37 for allowing the semiconductor integrated circuit substrate to interlock with a measurement object is instead provided so that it comes in contact with that substrate.

In such an arrangement, when a displacement in the C—C direction is applied to an end point 37A of the rod 37, a quantity of that displacement is transmitted to the semiconductor integrated circuit substrate through the rod 37. Namely, the semiconductor integrated circuit substrate 12 indicates a quantity of displacement equal to a quantity of displacement in the C—C direction of the end point 37A of the rod 37. In this case, an induced current corresponding to a displacement velocity of the semiconductor integrated circuit substrate 12 flows in the electromagnetic coil 13. Accordingly, by measuring such an induced current by a galvanometer, etc. through conductors (not shown), velocity, position, and acceleration, etc. can be calculated.

It is to be noted that the mechanism for allowing the substrate to interlock with a measurement object is not limited to the rod, but may be other mechanisms.

Fourth Embodiment

Figure 13:
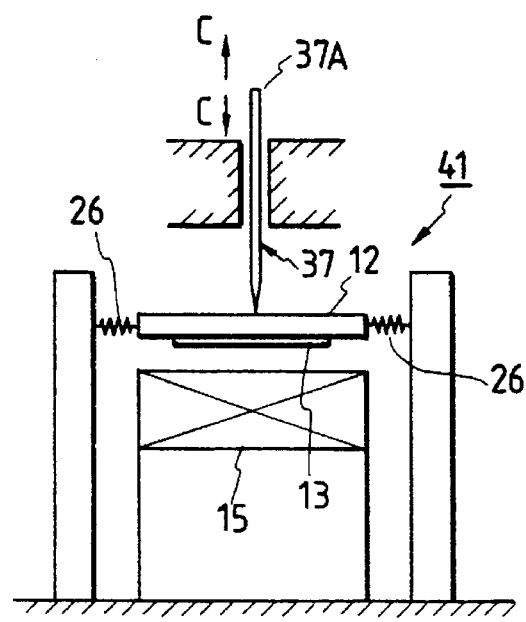
FIG. 13 is a view showing the structure of a displacement sensor which is a fourth embodiment of this invention.

Further, as shown in FIG. 13, a displacement sensor of a structure such that the optical integrated circuit type pickup is removed from the second embodiment of FIGS. 10 and 11, and a rod 37 of the interlocking means is instead provided so that it comes in contact with the semiconductor integrated circuit substrate is also effective as a fourth embodiment of this invention.

Fifth Embodiment

Figure 14:
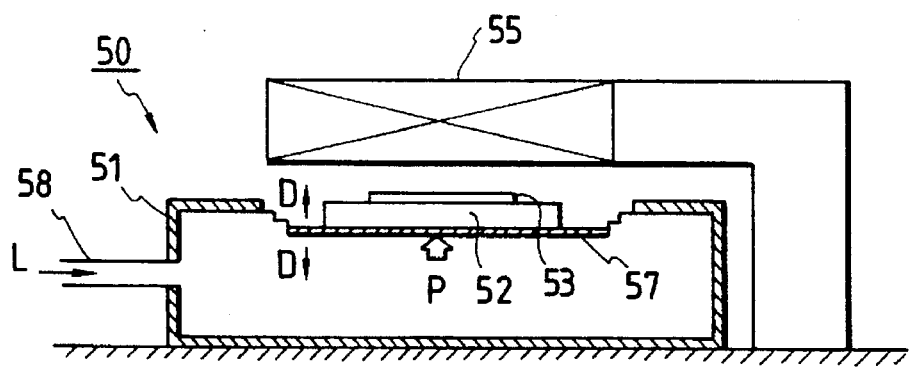
FIG. 14 is a view showing the cross section of a pressure sensor which is a fifth embodiment of this

The cross section of a pressure sensor which is a fifth embodiment of a semiconductor integrated circuit device according to this invention is shown in FIG. 14.

This pressure sensor 50 comprises a pressure vessel 51 for containing fluid for measuring pressure, and a semiconductor integrated circuit substrate 52. The semiconductor integrated circuit substrate 52 is affixed, on the pressure vessel 51, on a diaphragm 57 serving as the support means and for allowing the substrate to interlock with a measurement object, and the semiconductor integrated circuit substrate 52 includes an electromagnetic coil 53. Further, a magnet 55 for producing a magnetic field is provided immediately above the semiconductor integrated circuit substrate 52. The fluid L is conducted into the pressure vessel 51 through a pouring tube 58.

By employing the above-mentioned arrangement, when the pressure P of the fluid L poured into the pressure vessel 51 changes, the diaphragm changes in the D—D direction. As a result, the semiconductor integrated circuit substrate 52 moves in the D—D direction. Thus, an induced current flows in the electromagnetic coil 53. By employing this induced current by using a galvanometer, etc. through conductors (not shown), it is possible to calculate the pressure P of the fluid L.

Sixth Embodiment

Figure 15:
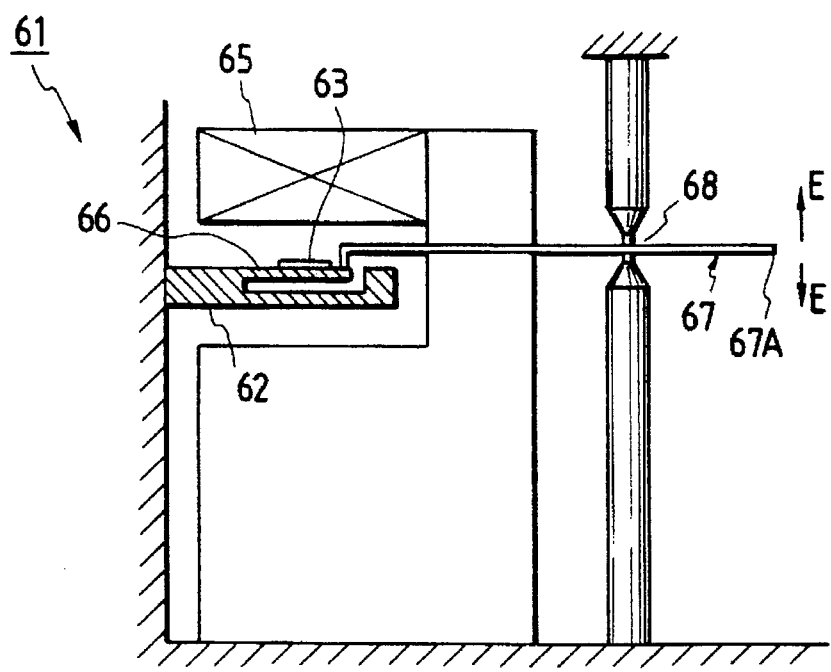
FIG. 15 is a view showing the cross section of a displacement sensor which is a sixth embodiment of this invention.

A displacement sensor which is a sixth embodiment of a semiconductor integrated circuit device according to this invention is shown in FIG. 15.

This displacement sensor 61 comprises a semiconductor integrated circuit substrate 62, a magnet 65 for producing a magnetic field, a rod 67 for allowing the substrate 62 to interlock with a measurement object, and a support 68.

The magnet 65 is provided immediately above the semiconductor integrated circuit substrate 62. Further, a cantilever member 66 is formed on the semiconductor integrated circuit substrate 62. An electromagnetic coil 63 is provided on the cantilever member 66. In this embodiment, the cantilever member 66 constitutes the support means.

The rod 67 is in contact with the cantilever member 66 to transmit a displacement in the E-E direction of an end point 67A to the cantilever member 66 by the support 68.

By employing such a configuration, this displacement sensor 61 has, in the same manner as in the displacement sensor shown in FIGS. 12 and 13, a sensor function to respond to a displacement given to the terminal point 67A of the rod 67 to convert a quantity of that displacement to an electric output to output it.

In this embodiment, the support means is incorporated as the cantilever member into the semiconductor integrated circuit substrate. The displacement sensor of this embodiment can be advantageously smaller than the displacement sensors of the third and fourth embodiments shown in FIGS. 12 and 13. It is to be noted that the mechanism for allowing the substrate to interlock with a measurement object is not limited to the rod, but may be other mechanisms.

Figure 16A:
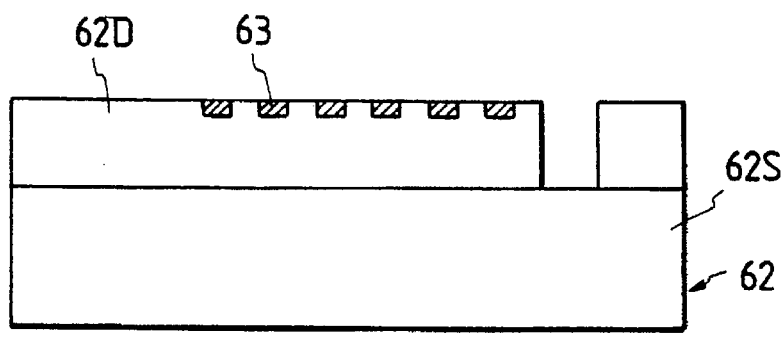
FIGS. 16A to 16C are views showing a method of forming the displacement sensor shown in FIG. 15, respectively.
Figure 16B:
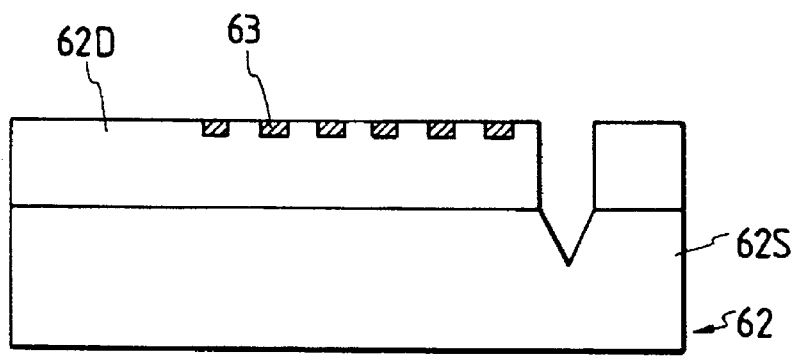
Figure 16C:
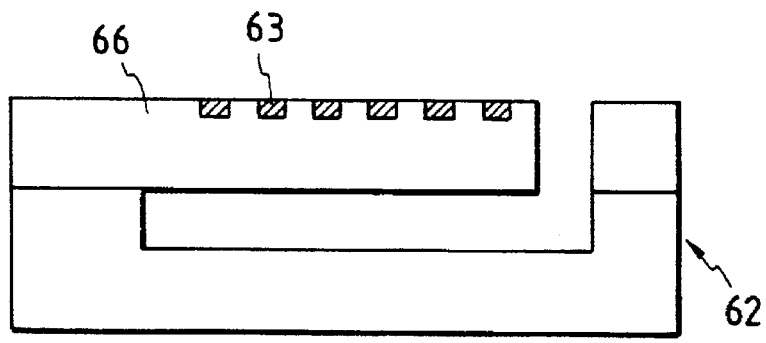

A method of forming the cantilever member 66 of the semiconductor integrated circuit substrate 62 is shown in FIG. 16.

Initially, a silicon oxide film 62D is formed on a silicon substrate 62S.

An electromagnetic coil 63 is then formed by the multilayer interconnection formation technology.

Subsequently, the silicon oxide film 62D is etched (FIG. 16(A)).

Then, the exposed silicon surface is etched by the anisotropy etching of which the each rate varies in dependence upon the direction of the crystal. In the beginning, etching proceeds so that a V-shaped groove is formed (FIG. 16(B)).

Then, etching is further caused to proceed to etch the lower portion of the silicon oxide film so that a portion of the silicon oxide film portion is left. Thus, cantilever member 66 including electromagnetic coil 63 on the surface thereof can be formed (FIG. 16 (C)).

Seventh Embodiment

Figure 17:
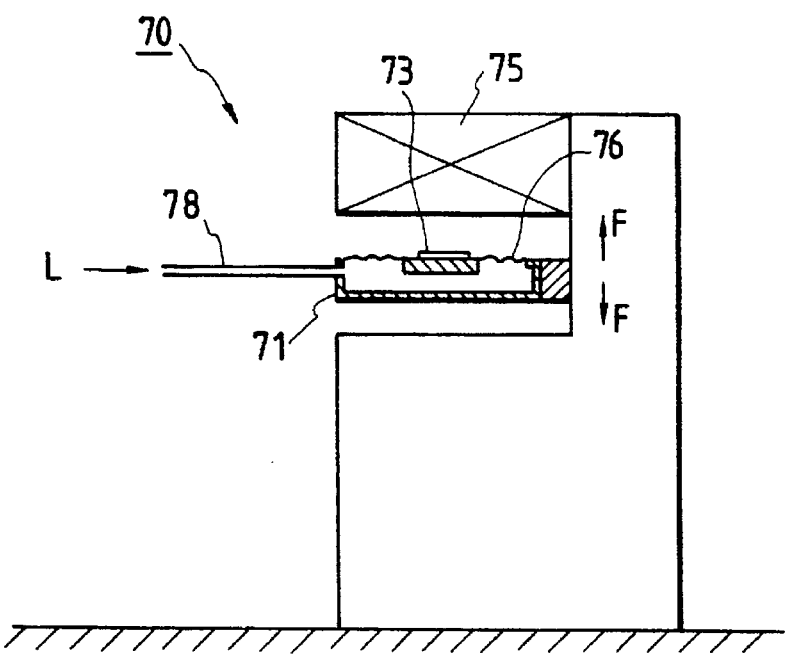
FIG. 17 is a views showing the cross sections of a pressure sensor which is a seventh embodiment of this invention.

A pressure sensor which is a seventh embodiment of a semiconductor integrated circuit device according to this invention is shown in FIG. 17.

This pressure sensor 70 comprises e semiconductor pressure vessel 71, and a magnet 75 for producing a magnetic field provided immediately above the semiconductor pressure vessel 71. A diaphragm 76 is provided in the semiconductor pressure vessel 71. An electromagnetic coil 73 is provided on the diaphragm 76. Further, fluid L for measuring a pressure is conducted into the semiconductor pressure vessel 71 through a pouring tube 78 communicating with the semiconductor pressure vessel 71. In this case, the diaphragm 56 allows the semiconductor integrated circuit substrate to interlock with a measurement object.

By employing the above-described configuration, when the pressure of the fluid L poured into the semiconductor pressure vessel changes, the diaphragm 76 and the electromagnetic coil 53 moves in the F—F direction. Accordingly, since an induced current flows in the electromagnetic coil it is possible to calculate the pressure of the fluid L by measuring that induced current by using a galvanometer, etc. through conductors (not shown).

A method of forming this semiconductor pressure vessel 71 is shown in FIG. 18.

By diffusing in advance boron, etc. into an area on the side of the surface of the silicon substrate 72S, an etching stop portion 72B for stopping etching is formed.

Figure 18A:
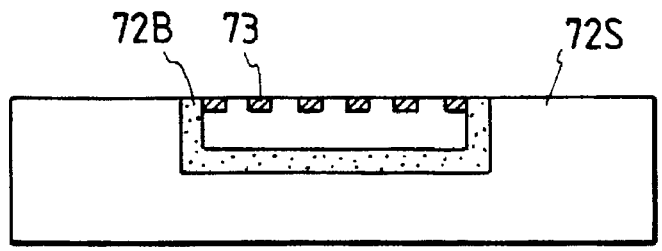
FIGS. 18A to 18E are views showing a method of forming the pressure sensor showing in FIG. 17, respectively.

Then, electromagnetic coil 73 is formed by the multilayer interconnection technology within the portion surrounded by the etching stop portion 72B (FIG. 18(A)).

Figure 18B:
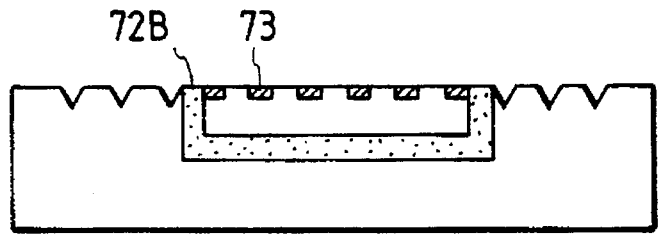

Then, etching is applied to the bellows portion of the diaphragm around the electromagnetic coil 73 on the surface of the silicon substrate 72S (FIG. 18(B)).

Figure 18C:
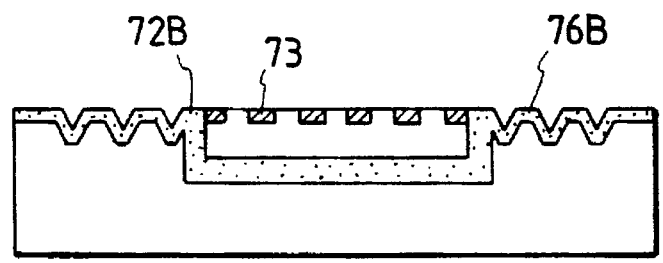
Figure 18D:
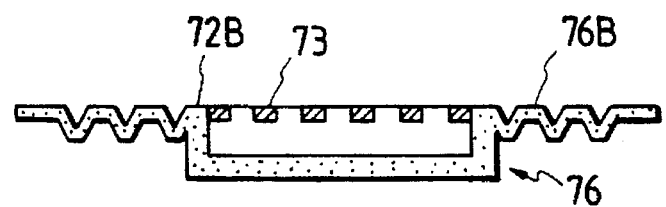
Figure 18E:
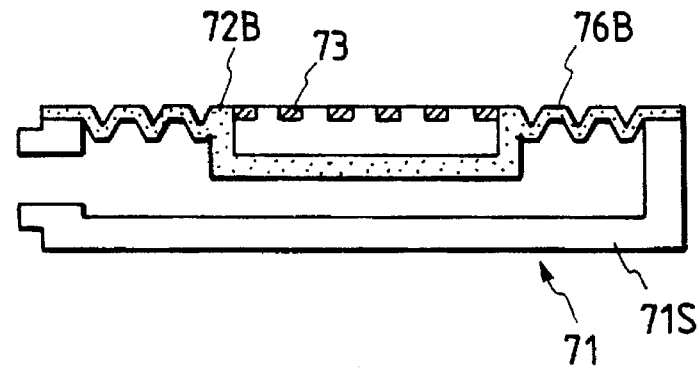

Then, boron, etc. is diffused from the surface to form an etching stop layer 76B (FIG. 18(C)).

Then, when etching is applied from the back side of the silicon substrate 72S, etching is stopped at the etching stop portion 72B and the etching stop layer 76B. As a result, a diaphragm 76 including the electromagnetic coil 73 on the surface thereof and including the bellows portion is left (FIG. 18 (D)).

Finally, the diaphragm 76 and the silicon member which will serve as the bottom portion of the semiconductor pressure vessel 71 are bonded by silicon-to-silicon bonding. Thus, semiconductor pressure vessel 71 can be formed (FIG. 18(S)).

The configurations and the numbers of the coil patterns in the above-described third to seventh embodiments are not limited to those mentioned therein, but may be other configurations and numbers.

Further, sensors in the above-described third to seventh embodiments can measure not only so called mechanical changes in the physical quantity such as displacement, velocity and the like, but also changes in the magnetism. Namely, when an external magnetic field changes, for example, when an object producing a magnetic filed comes into contact with the sensor and is away from therefrom, or the like, it is also possible to measure changes in a magnetic filed by measuring an inductive current which is caused to flow by the mutual inductive action of the electromagnetic coil.

In the above-described first to seventh embodiments, the magnet for producing a magnetic field may be a permanent magnet or an electromagnet.

In addition, the semiconductor integrated circuit device of this invention can be applied not only as a semiconductor integrated circuit device having an actuator function and a semiconductor integrated circuit device having a sensor function, but also as a semiconductor integrated circuit device having an actuator function and a sensor function combined with each other. For example, in the first and second embodiments, an approach may be also employed to further provide a velocity coil for detecting a velocity of the optical head on the semiconductor integrated circuit substrate 12 to constitute a miniaturized optical head having a function to detect a velocity at the time of track jump motion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A lightweight and dimensionally compact semiconductor integrated circuit device, comprising:
   a) magnet means for establishing a magnetic field;
   b) a generally planar semiconductor substrate having a surface proximate to and facing the magnet means,
   c) a generally planar electromagnetic coil fixedly disposed on said surface,
   d) flexible support means for movably supporting the substrate, and attendantly the coil, within a magnetic field established by the magnet means such that the substrate and coil are oriented perpendicular to a direction of said magnetic field, and
   e) electrical conductor means connected to the coil,
   f) wherein a current applied to the coil through the conductor means causes a displacement of the coil and attendantly the substrate, and a displacement of the coil and substrate causes a current to be induced in the coil.

2. A semiconductor integrated circuit device as set forth in claim 1, wherein said support means has elasticity.

3. A semiconductor integrated circuit device as set forth in claim 1, wherein said semiconductor integrated circuit device is constructed to deliver a drive power to said electromagnetic coil through said conductor means so that it is operable as an actuator.

4. A semiconductor integrated circuit device as set forth in claim 1, wherein said semiconductor integrated circuit substrate is provided with an optical integrated circuit type pickup comprising a laser diode, a beam splitter, and a photo detector.

5. A semiconductor integrated circuit device as set forth in claim 1, wherein said semiconductor integrated circuit device is constructed to arrange said semiconductor integrated circuit substrate so that it interlocks with a measurement object to determine the amount of induced current produced in said electromagnetic coil when said semiconductor integrated circuit substrate interlocks with said measurement object, whereby said semiconductor integrated circuit device is operable as a sensor.

6. The device of claim 1 wherein said coil is etched on said surface.

7. The device of claim 1 wherein said coil is deposited on said surface.

8. The device of claim 1, wherein said coil includes a plurality of coil turns, each of said turns being disposed directly on said surface so as to be disposed along the same plane.

9. A semiconductor integrated circuit device as set forth in claim 2, wherein said support means is constituted by a bent flexible printed wiring board.

10. A semiconductor integrated circuit device as set forth in claim 4, wherein the direction in which said semiconductor integrated circuit substrate is movable is the direction of an optical axis of a laser beam emitted from said optical integrated circuit type pickup.

11. A semiconductor integrated circuit device as set forth in claim 4, wherein the direction in which said semiconductor integrated circuit substrate is movable is the direction perpendicular to an optical axis of a laser beam emitted from said optical integrated circuit type pickup.

12. A semiconductor integrated circuit device as set forth in claim 5, wherein said sensor is a sensor for measurement of displacement.

13. A semiconductor integrated circuit device as set forth in claim 5, wherein said sensor is a sensor for measurement of pressure.

14. A semiconductor integrated circuit device as set forth in claim 5, wherein said sensor is a sensor for measurement of magnetism.

* * * * *